United States Patent [19]

Ohta et al.

[11] Patent Number: 5,685,933
[45] Date of Patent: Nov. 11, 1997

[54] METHOD OF MANUFACTURING A DRIVE SHAFT

[75] Inventors: Tadao Ohta, Okazaki; Shigenori Tamaki, Toyota; Motohiro Mizuno, Toyota; Masahiko Morinaga, Toyota; Yasuyuki Suzuki, Toyota, all of Japan

[73] Assignee: Toyota Jidosha Kabushiki Kaisha, Toyota, Japan

[21] Appl. No.: 701,992

[22] Filed: Aug. 23, 1996

Related U.S. Application Data

[63] Continuation of Ser. No. 231,429, Apr. 26, 1994, abandoned.

[30] Foreign Application Priority Data

| Apr. 26, 1993 | [JP] | Japan | 5-122041 |
| Oct. 26, 1993 | [JP] | Japan | 5-289912 |
| Feb. 7, 1994 | [JP] | Japan | 6-034213 |

[51] Int. Cl.⁶ ............................... B65H 81/00
[52] U.S. Cl. .................... 156/175; 156/169; 156/173; 264/258; 464/181; 464/183; 464/903
[58] Field of Search ........................ 156/172, 173, 156/175, 169; 464/181, 183, 903, 904; 29/888.09, 888.091, 888.092; 264/258

[56] References Cited

U.S. PATENT DOCUMENTS

| 2,843,153 | 7/1958 | Young | 156/320 X |
| 3,586,058 | 6/1971 | Ahrens | 138/103 |
| 3,651,661 | 3/1972 | Darrow | 464/181 |
| 4,335,587 | 6/1982 | Thomamveller et al. | 156/175 X |
| 4,747,806 | 5/1988 | Krude et al. | 464/181 X |
| 4,849,152 | 7/1989 | Rumberger | 156/173 X |
| 5,062,914 | 11/1991 | Fuchs et al. | 156/173 X |
| 5,135,596 | 8/1992 | Pabsch et al. | 156/173 X |
| 5,211,901 | 5/1993 | Fray | 264/258 X |
| 5,225,016 | 7/1993 | Sarh | 156/173 X |
| 5,314,382 | 5/1994 | Pfeifer | 464/183 X |
| 5,428,896 | 7/1995 | Auberon et al. | 29/888.09 |

FOREIGN PATENT DOCUMENTS

| 2744586 | 4/1979 | Germany | 156/172 |
| 47-39224 | 10/1972 | Japan | 156/172 |
| 54-28368 | 3/1979 | Japan | 156/173 |
| 63-92440 | 4/1988 | Japan | 156/175 |
| 63-166519 | 7/1988 | Japan | 156/172 |
| 3-59141 | 3/1991 | Japan . |
| 3-157511 | 7/1991 | Japan . |
| 5229018 | 9/1993 | Japan | 156/175 |

*Primary Examiner*—Jeff H. Aftergut
*Attorney, Agent, or Firm*—Oblon, Spivak, McClelland, Maier & Neustadt, P.C.

[57] ABSTRACT

An FRP drive shaft wherein the shaft body and the flanges are formed in a body and a method of manufacturing the same are disclosed. The shaft body is formed by winding a resin impregnated fiber on a mandrel having pins on its circumferential surface while hooking the fiber on the pins. The fiber is then circumferentially wound to form a hoop-like reinforcing band near each end of the shaft body. After the pins and end parts of the mandrel are removed, each end portion of the shaft body is expanded by a pressing mold to form a flange. After hot setting, the remaining part of the mandrel is removed.

7 Claims, 20 Drawing Sheets

5,685,933

METHOD OF MANUFACTURING A DRIVE SHAFT

This application is a continuation of application Ser. No. 08/231,429, filed on Apr. 26, 1994, now abandoned.

BACKGROUND OF THE INVENTION

1. Field of the Invention

The present invention relates to a drive shaft formed of fiber reinforced resin and a method of manufacturing the drive shaft.

2. Description of the Related Art

Fiber reinforced resin has lately been used to form a propeller shaft of a motor vehicle, one type of drive shaft, for weight reduction, which is increasingly demanded.

In a normal construction of motor vehicles, a propeller shaft, which connects a transmission unit and a differential gear unit (hereinafter referred to as "transmission and the like"), must provide for predetermined joint angles respectively to the transmission and the like because the two units are mounted at different heights. To achieve such joint angles, a variety of universal joints can be employed, for example, a Hooke joint(or Cardan joint), a flexible joint and a constant velocity joint. If the joint angle required is relatively small, flexible joints are most often employed.

FIG. 50 shows one type of flexible joint, that is, a fiber reinforced plastic (FRP) disc joint 1 as described in, for example, Japanese Patent Application Laid-open No. 64-49722. In this type, the disc joint 1 has a plurality of bolt inserting holes 2 (six holes in FIG. 50) formed with reference to a single pitch circle. The area around the bolt inserting holes 2 is formed with a relatively thicker-walled portion 3 (about 3 mm, for torque transmission). The areas between said thicker portions 3 are formed with relatively thin(about 1 mm)-walled portions 4 (flexible portion). During assembly, half (three in FIG. 50) of the bolt inserting holes 2 are used alternately for bolting the joint to a transmission and the like, and the other half of the holes 2 are used for bolting it to a propeller shaft. By flexible bending of the thin portions 4 the predetermined joint angles are readily obtained.

If a disc joint 1 as described above is employed for connecting, the propeller shaft and the transmission and the like need to have at ends thereof flanges having substantially the same diameter as the disc joint. Conventionally, such flanges are provided by connecting a metallic yoke to one end of the propeller shaft or the transmission and the like. Because the metallic yokes are considerably heavy, they offset a significantly large part of the advantage of a weight reduction by the employment of FRP in a propeller shaft.

SUMMARY OF THE INVENTION

The present invention is intended to eliminate the problems stated above. It is an object of the invention to provide an FRP drive shaft which fully enjoys the advantages of fiber reinforced plastics in weight reduction and a method of producing the same. Another object is to provide a structure for connecting a drive shaft and a disc joint to each other by which the connection strength can be substantially enhanced.

According to a feature of the present invention, there is provided a drive shaft comprising a shaft body and an end flange which have been molded of fiber reinforced resin in a body. Since the drive shaft and the end flange are formed of fiber reinforced resin in a body, the drive shaft is considerably reduced in weight compared with a conventional FRP drive shaft having a metallic yoke.

According to the first invention as a method of manufacturing the drive shaft, it is characterized in that the flange is formed by the steps of forming a shaft body by winding a resin impregnated fiber on the mandrel provided with a plurality of pins on its periphery while hooking the fiber on each pin and expanding an end portion of the shaft body. In this case, preferably, the resin impregnated fiber is hooked on the pins adding extra winding on any other pin so as to adapt to the above expansion of the end of the mandrel.

According to the second invention of the method, it is characterized in that the flange is formed by the steps of winding a resin impregnated fiber on the mandrel while hooking the fiber on a plurality of pins, provided on the outer circumference and extending perpendicular to the mandrel axis, of the jig fit slidably on the mandrel, thus to form a taper-shaped shaft body, and winding the fiber on the above taper-shaped portion of the shaft body like hoop, subsequently sliding the jig on the mandrel to form a flange.

Further, according to the third invention of the method, it is characterized in that the flange is formed by the steps of preparing a mandrel being connected with a structure of comprising a plurality of frames capable to expand like an umbrella and to elongate and retract, forming a shaft body by winding the fiber on the mandrel while hooking the fiber on the pins provided on each one of the frames in retracted manner, subsequently expanding the shaft body while elongating the frame.

According to the connecting structure of the drive shaft and the disc joint of the present invention, it is characterized in that on each of abutting faces of the flange molded in a body with the shaft body formed of resin impregnated fiber and the disc joint, a plurality of protrusions or thicker-walled portions arranged radially and regularly, abutting said opposing protrusions or thicker-walled portions directly or through a reinforcing member and bolting said flange and the disc joint further through other reinforcing members attached to the rear recesses of the protrusions or the rear side of the thicker-walled portions.

In the structure of the drive shaft thus formed, since the shaft body and its end flange is molded in a body with resin impregnated fiber, the total weight is reduced compared with the case in which metallic yokes are employed.

Further, in the first method invention, since the resin impregnated fiber is wound on the mandrel so as to form a shaft body in the manner of fiber winding and the end thereof is expanded to form a flange, a drive shaft with a flange all made of resin impregnated fiber is easily molded in a body. In this case, if the fiber is hooked on the pins of the mandrel in such a manner as the fiber is excessively hooked on other pins to obtain an easy expansion of the end.

Still further, in the second method invention, since the flange is molded using sole jig, the productivity is increased. And since the flange is molded while squeezing the taper-shaped portion of the filament and giving a tension to the filament, the concentration of the filament is increased and the fiber can be prevented from loosening, thereby the configuration precision and the strength of the flange are increased.

Still further, in the third invention of the method, the flange is molded at a time by elongation of bones to increase the productivity and make easier the expansion of the end by elongation and retraction of the bones.

Still further, in the connection structure of the drive shaft and the disc joint, reinforcing members which are attached to the rear recesses of the protrusions or the thicker-walled portions are employed for bolting the disc joint to the flange of the drive shaft molded in a body with fiber reinforced resin, the walls of the recesses or the side surfaces of the thick portions serve as torque receiving surfaces, thus reducing the stress which occurs adjacently the inner surface of each bolt inserting hole. Therefore, this connecting structure withstand a large and/or rapid torque fluctuation.

Further objects, features and advantages of the present invention will become apparent from the following description of the preferred embodiments with reference to the attached drawings.

DETAILED DESCRIPTION OF THE PREFERRED EMBODIMENTS

The preferred embodiments of the present invention will be described in detail hereinafter with reference to the attached drawings.

Figure 1A:
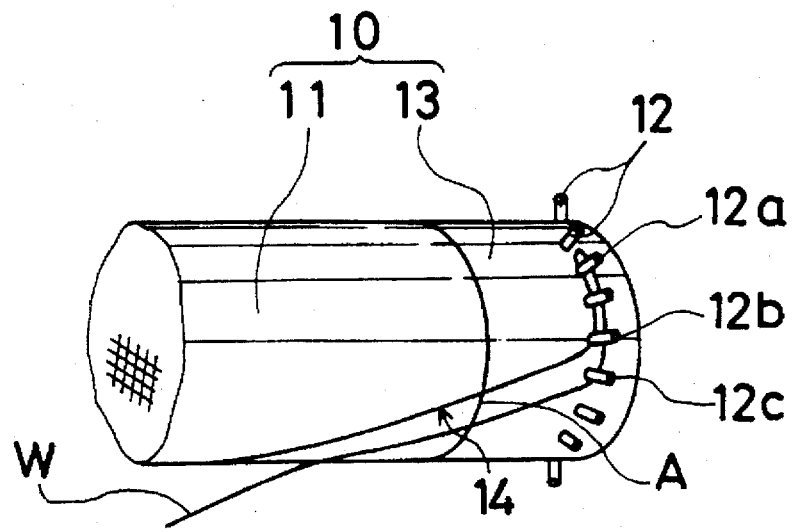
FIGS. 1a, 1b and 1c sequentially illustrate steps of a first embodiment of the drive shaft manufacturing of the present invention, showing main and auxiliary mandrels, resin impregnated fiber and a drive shaft being formed.
Figure 1B:
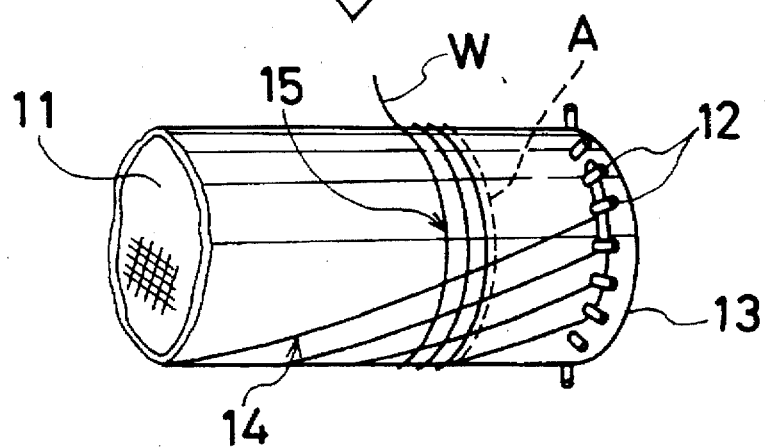
Figure 1C:
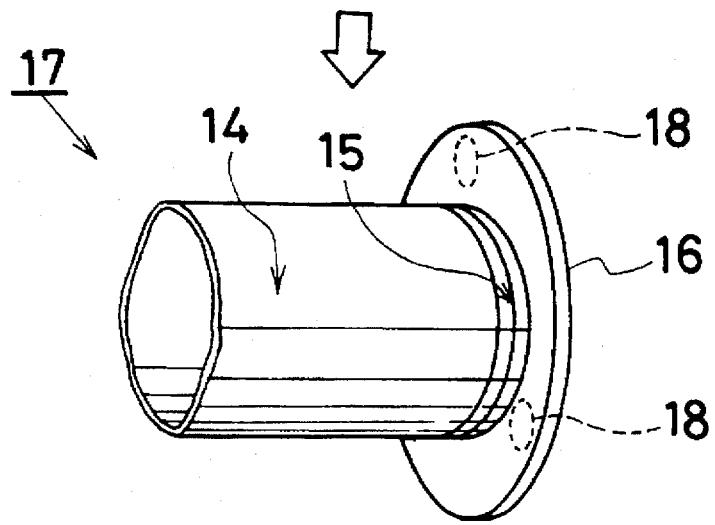

FIRST EMBODIMENT:

The first embodiment of the drive shaft manufacturing method of the invention will be described with reference to FIGS. 1a, 1b and 1c. A mandrel unit 10 used in this embodiment is composed of a long main mandrel 11 and two short auxiliary mandrels 13 (only one of which is shown in the figures) each connected to one of the ends of the main mandrel 11. Each of the auxiliary mandrels 13 has many pins 12 circumferentially aligned thereon. First, as shown in FIG. 1a, a resin impregnated fiber W is continuously wound on the mandrel unit 10 and hooked on the pins 12 in such a manner that the fiber W is strained over the circumferential surface of the mandrel unit 10 at a predetermined orientation angle with respect to the axis of the mandrel unit 10. A shaft body 14 is thus formed. Next, as shown in FIG. 1b, the resin impregnated fiber W is wound on a portion of the shaft body 14 i.e. just inside the mandrel A of the main mandrel 11 and the auxiliary joint 13 at an orientation angle which is perpendicular to the axis of the mandrel 11, thus forming a narrow hoop-like reinforcing band 15. Then, the pins 12 are removed from the auxiliary mandrels 13 and the auxiliary mandrel 13 is detached from the main mandrel 11. Subsequently, the end of the shaft body 14 is expanded to form a flange 16 by forcing a mold thereto as described below. After hot setting, the main mandrel 11 is pulled out from the shaft body 14, thus providing a hollow drive shaft (propeller shaft) 17 composed of the shaft body 14 and the flanges 16 which have been formed in a body, as shown in FIG. 1c.

The resin impregnated fiber W may be hooked on a single pin or a plurality of pins, at a time. For example, as shown in FIG. 1a, the fiber W may be hooked first on a pin 12b, laid over to a pin 12a, turned back therefrom and hooked on a pin 12c, thus forming a loop. If such loops of the fiber W each extending along a plurality of pins are formed at the ends of the shaft body 14, the flanges 16 can be readily formed. More specifically, when the pins 12 are removed, the loops become free to provide extra lengths of the fiber W needed for the subsequent expansion of the end portion of the shaft body 14.

After the drive shaft 17 is formed as described above, a plurality (two to four) of bolt inserting holes 18 are formed through the flanges 16. Using the bolt inserting holes 18, the drive shaft 17 is connected to disc joint as described above.

According to the first embodiment, since the shaft body 14 and the flange 16 is formed of fiber reinforced resin in a body, the entire drive shaft 17 is considerably reduced in weight compared with a conventional FRP drive shaft in which the flange is provided with connecting metallic yokes to the ends of the shaft. Furthermore, since the annular reinforcing band 15 is provided around the shaft body 14, the rigidity of the flange 16 is enhanced. Thus, the reliability of the drive shaft in connection with strength is increased.

Figure 2:
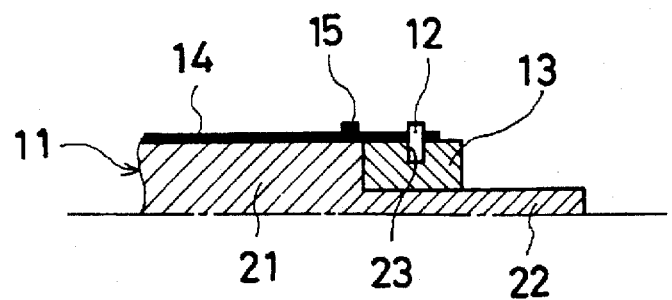
FIG. 2 is a sectional view of a mandrel unit used in the first embodiment of the invention.
Figure 3:
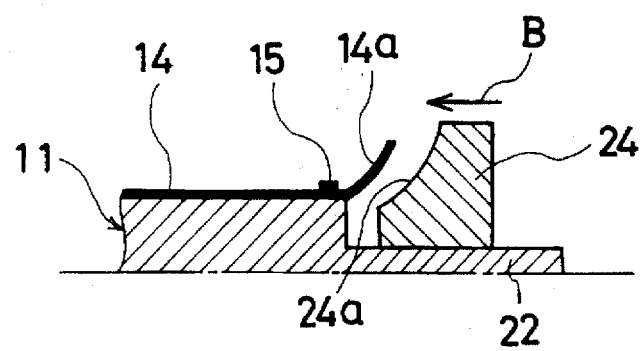
FIG. 3 is a sectional view of the mandrel and a part of a flange forming mold used in the first embodiment, illustrating how the part is used.
Figure 4:
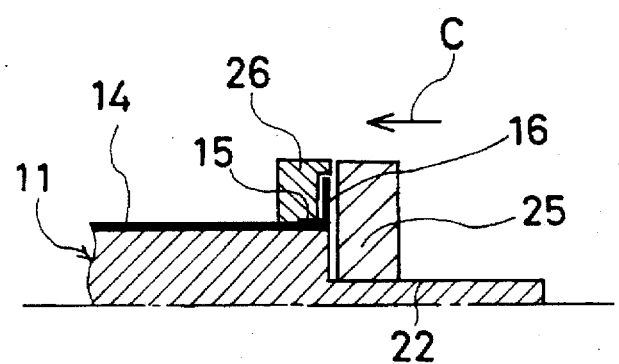
FIG. 4 shows a sectional view of another part of the flange mold used in the first embodiment, illustrating how the part is used.

FIGS. 2 to 4 show example structures of the mandrel unit 10 and the flange molds.

As shown in FIG. 2, the main mandrel 11 is formed of a large diameter portion 21 extending coaxially from the end of a small diameter portion 22, and the auxiliary mandrels 13 with the pins 12 is slidably fitted over the small diameter portion 22 of the main mandrel 11. Though the pins 12 are tightly fitted into holes 23 formed in each auxiliary mandrel 13, they can be pulled out by pulling.

After the shaft body 14 is formed on the thus-constructed mandrel unit 10 by winding the resin impregnated filament W while hooking it on the pins 12, the pins 12 are pulled out, thus allowing the auxiliary mandrel 13 to slide on the small diameter portion 22 of the main mandrel 11. When the auxiliary mandrels 13 are separated from the main mandrel 11, end portion 14a of the shaft body 14 is free to receive pressing molds.

Alternatively, the pins 12 may be screwed into the holes 23. Further, each auxiliary mandrel 13 may be provided with a cylinder means within it for supporting and retracting the pins into the auxiliary mandrel 13.

The set of flange-forming molds generally consists of a forcing mold 24 (FIG. 3) slidably fittable on the small diameter portion 22 of the main mandrel 11; a forming mold 25 (FIG. 4) also slidably fitted on the small diameter portion 22; and a backing mold 26 (FIG. 4) which is composed of two separable parts and holds a portion of the shaft body 14 that is provided with the reinforcing band 15 on the main mandrel 11. The forcing mold 24 has a curved surface 24a at its front which extends from the periphery of the mold 24.

After the auxiliary mandrel 13 is removed, the forcing mold 24 is forced into the free end portion 14a of the shaft body 14 by sliding it on the adjacent small diameter portion of the main mandrel 11 in the direction indicated by arrow B. The free end portion 14a is thus forced to expand conically as shown in FIG. 3. After the forcing mold 24 is removed, the forming mold 25 is fitted on the small diameter portion 22 and the backing mold 26 is placed on the shaft body 14 so as to hold it onto the main mandrel 11. When the forming mold 25 is moved in the direction indicated by arrow C, the expanded end portion 14a is clamped between the forming mold 25 and the backing mold 26, as shown in FIG. 4. The flange 16 having a predetermined shape is thus formed.

Figure 5:
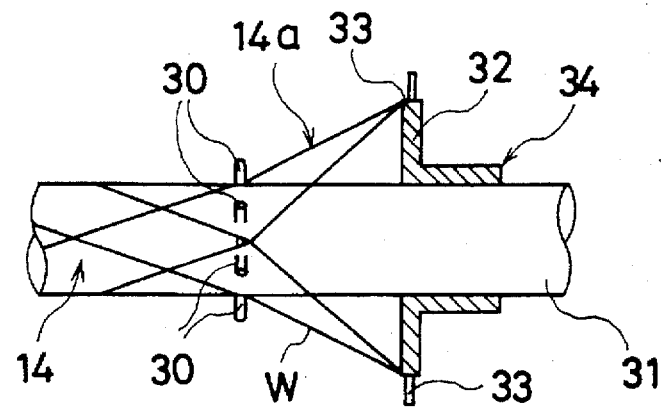
FIG. 5 illustrates an intermediate step of a second embodiment of the drive shaft manufacturing method of the invention, showing a side view of a mandrel with a fiber and a section of a jig.
Figure 6:
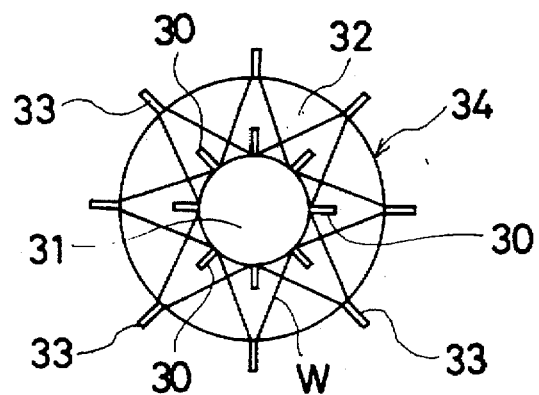
FIG. 6 is a front view of the mandrel, fiber and jig shown in FIG. 5.

SECOND EMBODIMENT:

The second embodiment of the drive shaft producing method of the invention will be described with reference to FIGS. 5 to 8. This embodiment uses a mandrel 31 carrying many mandrel pins 30 circumferentially aligned thereon and two hollow jigs 34 each having a large-diameter flange portion 32 carrying many flange pins 33 aligned on its circumference. The jig 34 is slidably fittable on the mandrel 31. This embodiment is carried out as follows. First, the jig 34 is fixed at a predetermined position on the mandrel 31. Then, as shown in FIGS. 5 and 6, while a resin impregnated filament W is wound on the mandrel 31, the filament W is hooked on the mandrel pins 30 and the flange pins 33 of the jig 34 so as to stretch therebetween, thus forming a shaft body 14 having end portions 14a. Since the diameter of the flange portion 32 of each jig 34 is larger than that of the mandrel 31, each end portion 14a becomes wider toward the end, that is, it has substantially the conical shape.

Figure 7:
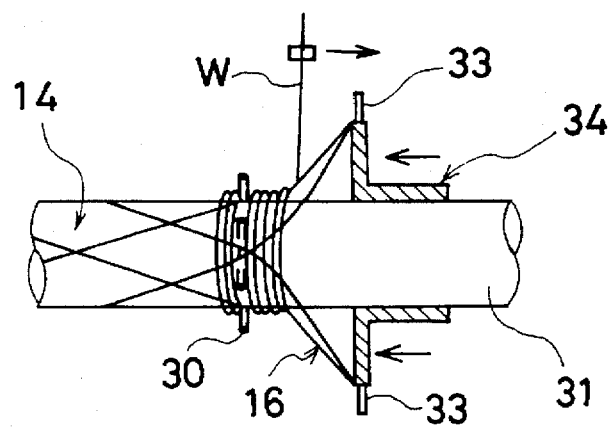
FIG. 7 schematically illustrates another step of the second embodiment of the invention.
Figure 8:
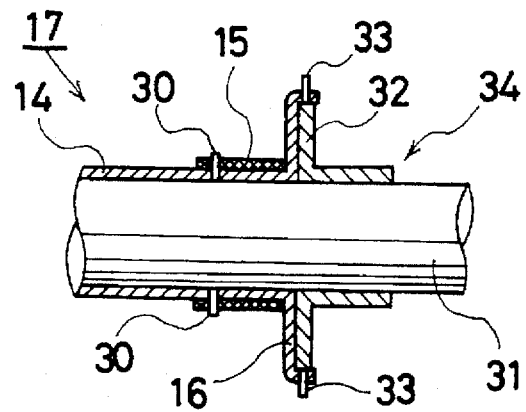
FIG. 8 schematically illustrates the final step of the second embodiment.

Next, as shown in FIG. 7, moving the jig 34 inwardly on the mandrel 31 while winding the resin impregnated fiber W on the tapered portion 14a of the shaft body 14 hoop-like to squeeze the fiber of the tapered portion 14a. And finishing said squeezing by getting the filament W touch tightly with the front face of the flange portion 32 of the the jig 34 as shown in FIG. 8, setting hot as it is, subsequently the pins 30 and 33 are removed and the mandrel 31 and the jig 34 are also removed from the molded product.

Thus, a hollow drive shaft 17 having the shaft body 14 and end flange 16 formed in a body is obtained.

Since, unlike the first embodiment, the second embodiment does not need a pressing mold, the second embodiment considerably increases the productivity and reduces the production cost. Further, according to the second embodiment, since the conical end portion 14a is squeezed to form the end flange 16, the concentration of the fiber is increased. Still further, since the tension of the fiber W is maintained during the process of forming the end flange 16, there is substantially no risk of loosening in the fiber W. Therefore, the flange 16 formed in the second embodiment achieves a greater strength than the flanges formed in the first embodiment. In addition, since the fiber W wound in the shape of a hoop near each end flange 16 forms a wide reinforcing band 15, the strength of the flange 16 is further enhanced.

Although the end flange 16 formed by the second embodiment has a star-like shape, the flange 16 can be provided with a sufficiently large area for forming the bolt inserting holes 18 (FIG. 1), by suitably predetermining the diameter of the flange portion 32 of the jig 34 and the number of pins 33 provided on the flange portion 32.

Figure 9:
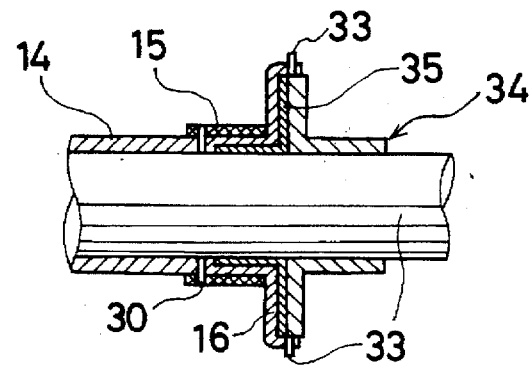
FIG. 9 schematically illustrates a modification of the second embodiment.

According to the second embodiment, a flange-shape insert 35 as shown in FIG. 9 may be used to underlie each end flange 16 and the adjacent portion when the fiber W is wound tight on the end portions 14a of the shaft body 14. Because the insert 35 becomes fixed firmly to the flange 16 and the adjacent portion during formation of the flange 16, the strength of the flange 16 is further enhanced.

Figure 10:
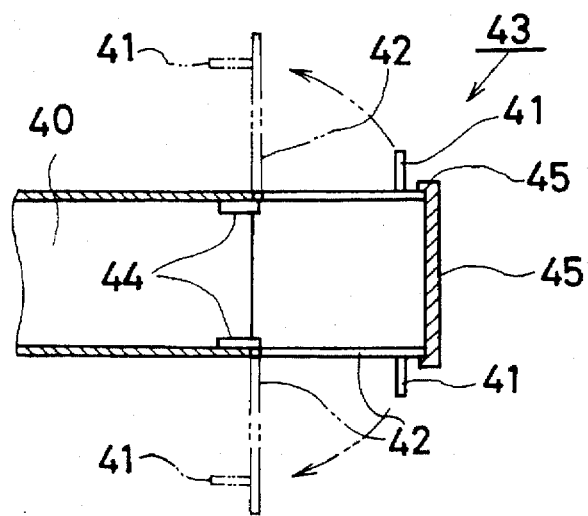
FIG. 10 is a schematic axial section of a mandrel used in a third embodiment of the drive shaft manufacturing method of the invention.

THIRD EMBODIMENT:

The third embodiment of the drive shaft producing method of the invention will be described with reference to FIGS. 10 to 14. This embodiment uses a tubular mandrel 40, as shown in FIG. 10, connected at each end to a framework 43 composed of a plurality of frames 42 each having a pin 41. The framework 43 is able to expand like an umbrella because each frame 42 is pivotably connected to the mandrel 40 by a joint 44 having a spring (not shown). The spring of each joint 44 urges the corresponding frame 42 in the expanding direction. In producing a drive shaft, the free ends of the frame 42 are held and closed to the cylinder like having the same diameter as that of the mandrel 40 using a holder 45 having an annular flange 45a, as shown in FIG. 10. Then, the pin 41 of the frame 42 is directed radially outwards.

Figure 11:
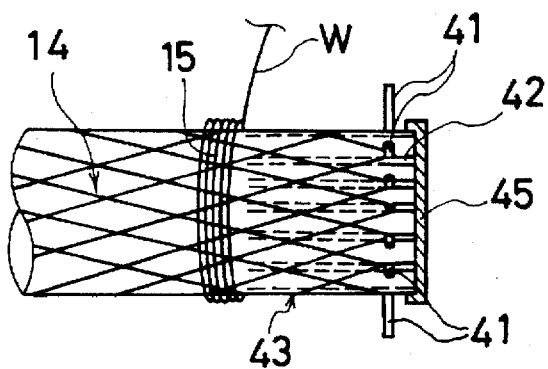
FIG. 11 illustrates an intermediate step of the third embodiment of the invention, showing the mandrel and a drive shaft being formed thereon.
Figure 12:
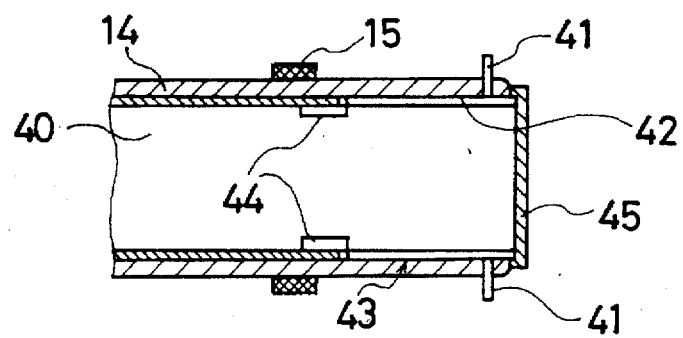
FIG. 12 is a section of the mandrel and the drive shaft being formed, taken on the plane of the sheet of FIG. 11.
Figure 13:
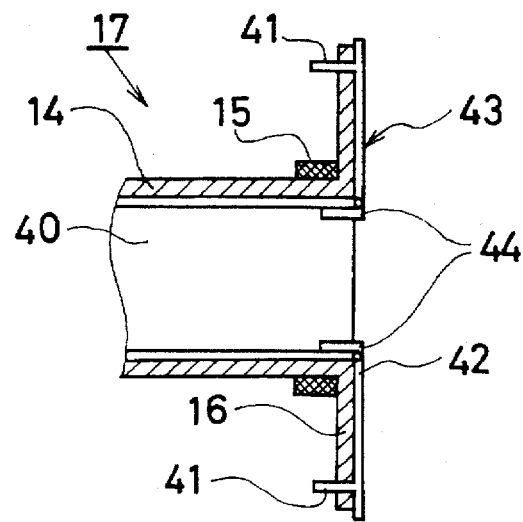
FIG. 13 illustrates the final step of the third embodiment.
Figure 14:
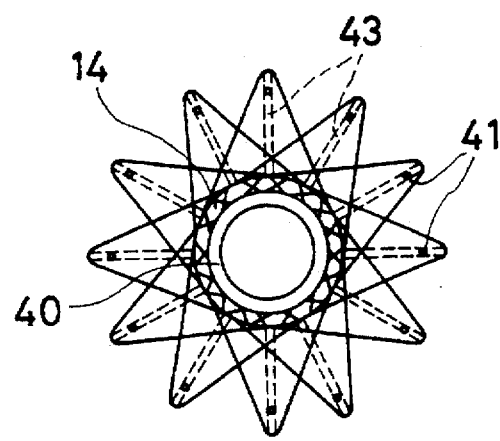
FIG. 14 is a front view of the mandrel and the drive shaft in the same step as in FIG. 13.

Next, as shown in FIGS. 11 and 12, a resin impregnated fiber W is wound on the mandrel 40 hooking on the pins 41 of the framework 43 to form a shaft body 14, then the fiber W is wound on a portion of the shaft body 14 corresponding to just inside of the joint portion of the mandrel 40 and the framework 43 to form a narrow hoop-like reinforcing band 15. When the stopper 45 is subsequently removed from the framework 43, the framework 43 expands until each frame 42 stands substantially perpendicular to the axis of the mandrel 40, as shown in FIGS. 13 and 14, by the elastic restoration force of the spring of a joint 44. A flange 16 is thus formed.

Although the flange 16 of the drive shaft 17 has a star-like contour as in the second embodiment, the flange 16 can be provided with a sufficiently large area for forming the bolt inserting holes 18 (FIG. 1), by suitably predetermining the length and number of frames 42 of the framework 43.

The third embodiment achieves advantages similar to those of the second embodiment. Since the third embodiment needs no molding process, the embodiment considerably increases the productivity and reduces the production cost. Further, since the fiber W is continuously strained during the process of forming a drive shaft with the flange, there is substantially no risk of loosening in the filament W. Therefore, the shape precision and strength of the flange will be significantly enhanced.

Figure 15:
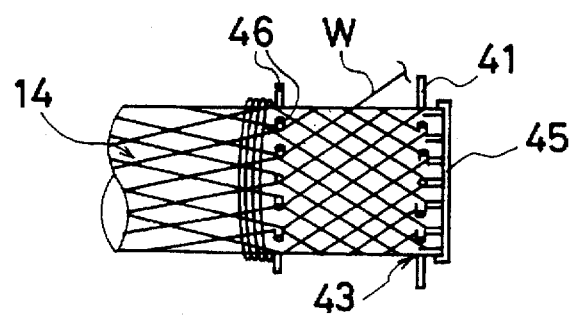
FIG. 15 illustrates a modification of the third embodiment, showing a side view of a mandrel and a drive shaft being formed thereon.

FIG. 15 shows a modification of the third embodiment. According to this modification, the mandrel 40 has many deflecting pins 46 circumferentially aligned around a portion adjacent to its end connecting to the framework 46. With the deflecting pins 46, the orientation angle of the resin impregnated filament W can be shifted. If the fiber W is wound at a larger orientation angle on the frameworks 43 than on the mandrel 40, the filament concentration in the flange 16 is accordingly increased, thus further enhancing the strength thereof.

Figure 16:
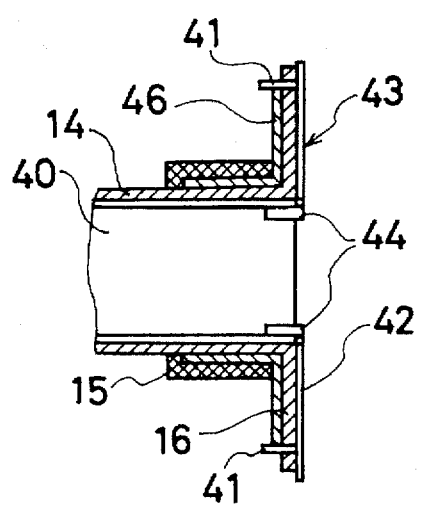
FIG. 16 illustrates another modification of the third embodiment, showing a sectional view of a mandrel and a drive shaft being formed thereon.

According to another modification as shown in FIG. 16, a flange-shape insert 46 is placed over the expanded end portion and the adjacent portion of the shaft body 14, and then the fiber W is wound on the shaft body 14 and the insert 46 to form the reinforcing band 15. Because the flange-shape insert 46 become firmly fixed to the shaft body 14, the reinforcing band 15 and the flange 16 during the process of forming the drive shaft 17, the strength of the flange 16 is further enhanced.

Figure 17:
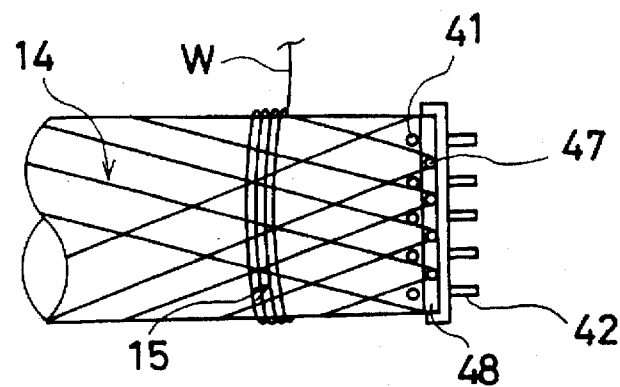
FIG. 17 illustrates a further modification of the third embodiment, showing a side view of a mandrel and a drive shaft being formed thereon.
Figure 18:
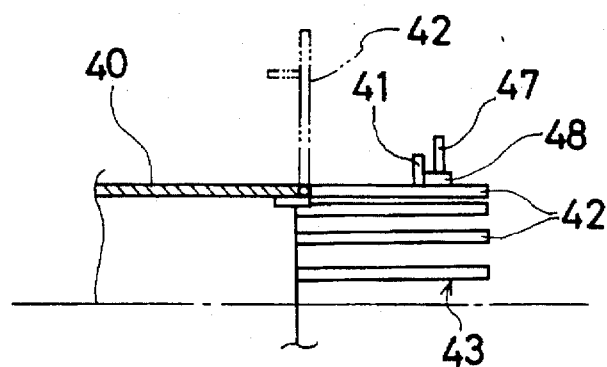
FIG. 18 is an axial section of the mandrel taken on the plane of the sheet of FIG. 17.

A further modification as shown in FIGS. 17 and 18 uses a ring 48 having many auxiliary pins 47 on the circumference to keep the framework 43 from expanding. For the fiber winding process, free end portions of the frames 42 of the framework 43 are inserted in the ring 48. A shaft body 14 is formed by winding the resin impregnated fiber W on the mandrel 40 and the framework 43 while hooking it on the auxiliary pins 47. When the auxiliary pins 47 are subsequently removed from the ring 48, the fiber W is drawn toward the pins 41 of the frames 42 by the release of the tension, and the fiber W thus loosens. As the framework 43 expands after removal of the ring 48, the pins 41 of the framework 43 catches the fiber W. Therefore, if the auxiliary pins 47 are suitably positioned, the end portion of the shaft body 14 over the framework 43 can be easily expanded without excessively straining the fiber W, and the fiber W caught on the pins 41 will be suitably strained when the framework 43 becomes substantially perpendicular to the mandrel 40. This modification thus facilitates forming the flange.

Figure 19:
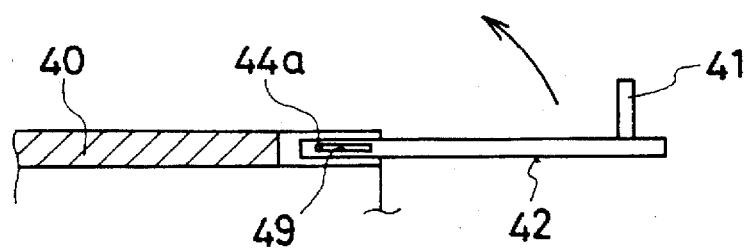
FIG. 19 schematically illustrates a fourth embodiment of the drive shaft manufacturing method of the invention, showing a portion of a mandrel used in the embodiment.
Figure 20:
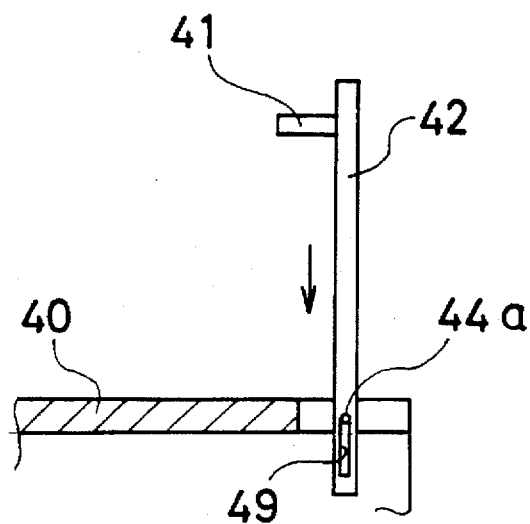
FIG. 20 illustrates the operation of the mandrel used shown in FIG. 19.

FOURTH EMBODIMENT:

The fourth embodiment of the drive shaft producing method of the invention will be described with reference to FIGS. 19 and 20. This embodiment uses a framework 43 which is similar to the framework used in the third embodiment. However, each frame 42 of the framework 43 used in the fourth embodiment has not only a pin 41 provided near the free end but also an elongated hole 49 formed near the base end. Each frame 42 is connected to a mandrel 40 by inserting the shaft 44a of a joint 44 in the elongated hole 29. Thus, each frame 42 is pivotable about the shaft 44a and movable along its length within a range corresponding to the length of the elongated hole 29.

For the filament winding process, the framework 43 is closed, and elongated to the outer limit of the movable range, and then fixed in the position by a suitable means. After a drive shaft 14 is formed by winding a resin impregnated filament W on the mandrel 40 and the framework 43 while hooking it on the pins 41, the framework 43 is released from the above-mentioned fixing means. When the framework 43 expands together with the end portion of the shaft body 14, each frame 42 is pushed in according to the increase of the angle 42 of the frame to the axis of the mandrel 40. Thus, this embodiment significantly facilitates forming flange without loosening in the fiber W by using, for example, the auxiliary pins 47 as shown in FIGS. 17 and 18.

FIFTH EMBODIMENT:

The fifth embodiment is a connection structure for connecting a disc joint 1 and a drive shaft 17 according to the present invention.

Figure 21:
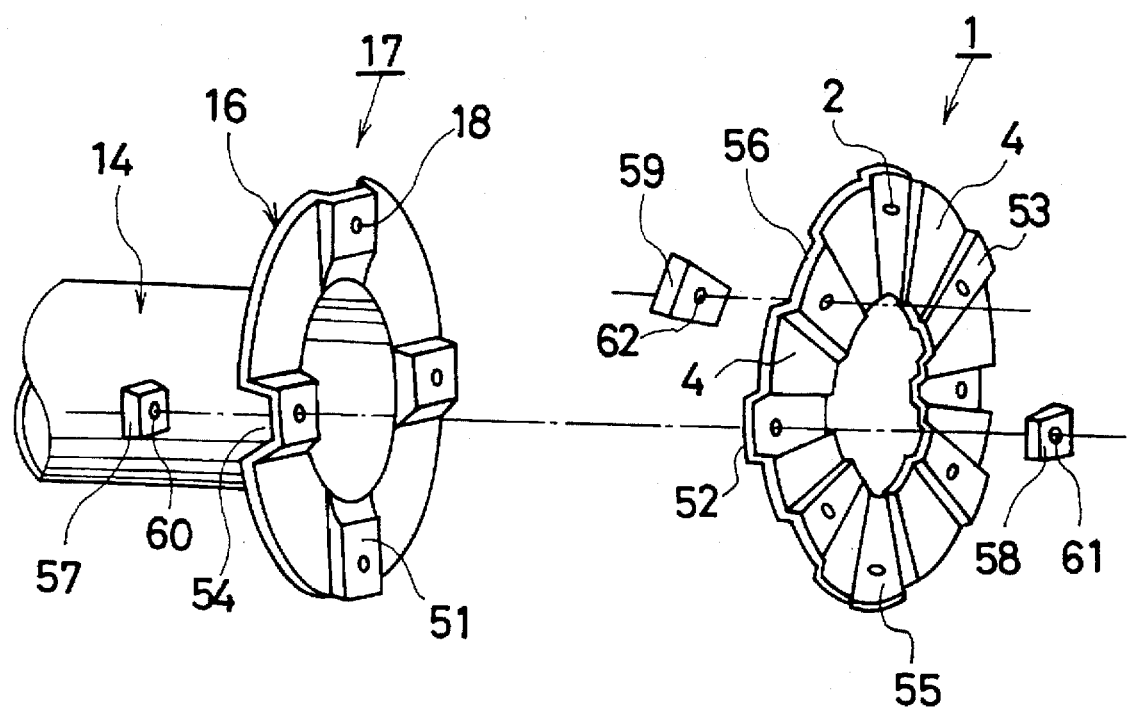
FIG. 21 is an exploded perspective view of an embodiment of the connection structure for connecting a drive shaft and a disc joint according to of the invention (a fifth embodiment of the invention).

Referring to FIG. 21, each flange 16 of the drive shaft 17 produced by any one of the above embodiments of the method of the invention may be formed so as to have, on its front side, plural (four in FIG. 21) projected seats 51 which are equidistantly arranged along the circumference and radially extend over the front side. A disc joint 1 to be connected to the drive shaft 17 needs to have plural (four in FIG. 21) projected seats 52 and 53 on the two sides, respectively, which are equidistantly arranged along the circumference and radially extend over the respective sides. The projected seats 52 on one side are used to connect the disc joint 1 to the drive shaft 17, and the projected seats 53 on the other side are used for connection to a transmission and the like. The projected seats 51 on one side of the flange 16 are formed by a method described below, in which the portions on the other side corresponding to the projected seats 51 are formed as recesses 54. The projected seats 52 on one side of the disc joint 1 are shifted from the projected seats 53 on the other side by 45° in the rotational direction. The portions between the projected seats 52 and 53 are formed as thin (flexible) portions 4. The disc joint 1 is formed by a method described below, in which the portions formed, corresponding to the projected seats 52 and 53, on the rear sides are formed recesses 55 and 56, respectively.

Connecting the drive shaft 17 and the disc joint 1 needs separate reinforcing members 57, 58 and 59 which are fittable into the recesses 54, 55 and 56 and provided with bolt inserting holes 60, 61 and 62, respectively. As partly shown in FIGS. 21 and 22, the disc joint 1 is fastened to the flange 16 of the drive shaft 17 by the following manner: positioning the disc joint 1 to the flange 16 so that the projected seats 52 on one side of the disc joint 1 abut the projected seats 51 on the flange 16; fitting the reinforcing members 57 and 58 into the recesses 54 and 55, respectively; inserting bolts (not shown) into the bolt inserting holes 60, 61 of the reinforcing members 57, 58, the bolt inserting holes 2 of the disc joint 1, and the bolt inserting holes 18 of the flange 16; and then screwing nuts (not shown) onto the bolts. The disc joint 1 and the transmission unit and the like are connected in substantially the same manner as described above, except that the reinforcing member 59 is fitted into the recess 56 of the disc joint 1. Because the abutment of the projected seats 51 and 52 provides a sufficiently large gap between the flange 16 and the disc joint 1, the reinforcing members 59 on the disk joint 1 will not interfere with the flange 16.

In the above-described connection structure (hereinafter, referred to as "the fifth embodiment"), the flexible (thin) portions 4 bend so as to achieve a predetermined joint angle. Furthermore, because the side walls 54a, 55a of the recesses 54, 55 receive a large portion of the torque transmitted between the flange 16 of the drive shaft 16 and the disc joint 1, the stress occurring at the inner surfaces of the bolt inserting holes is accordingly reduced. With the torque receiving side walls 54a, 55a, the FRP flange 16 and the FRP disc joint 1 can withstand a considerably large torque fluctuation. Thus, the reliability in connection with strength is significantly improved. If the disc joint 1 is formed of a metal plate so as to have a spring characteristic, such torque receiving walls will achieve similar effects. In addition, according to this embodiment, because each of the projected seats 52 and 53 of the disc joint 1 has a sector-like shape that becomes wider from the inner periphery toward the outer periphery of the disc joint 1, deformation of an outer peripheral portion of the disc joint 1, which occurs in accordance with the joint angle, will cause no large stress in the outer peripheral portion. The durability of the disc joint 1 is thus enhanced.

Figure 23:
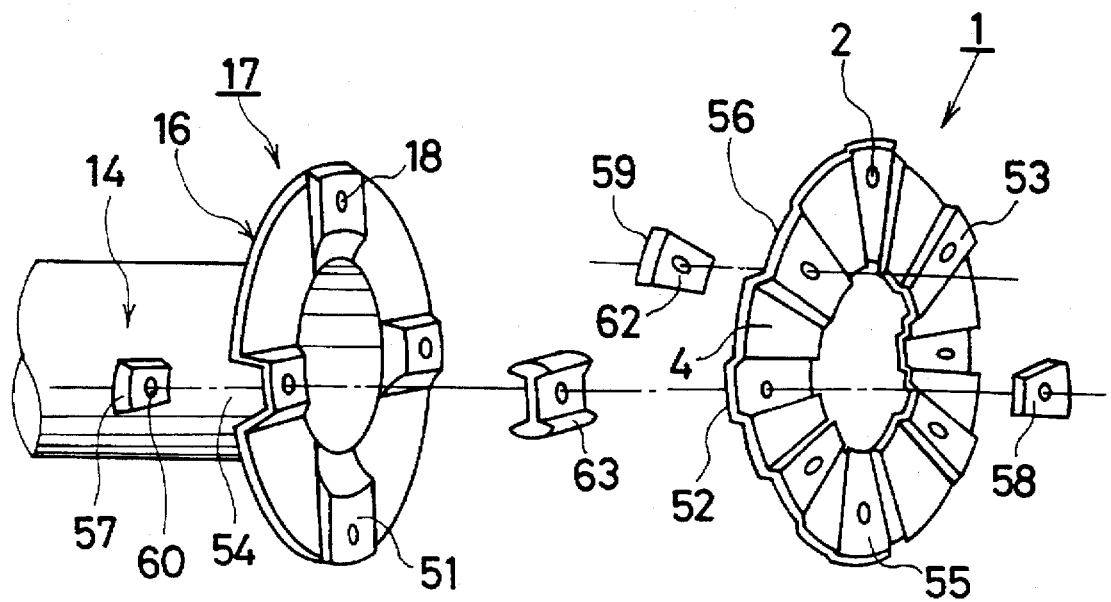
FIG. 23 is an exploded perspective view of another embodiment of the connection structure (a sixth embodiment of the invention).
Figure 24:
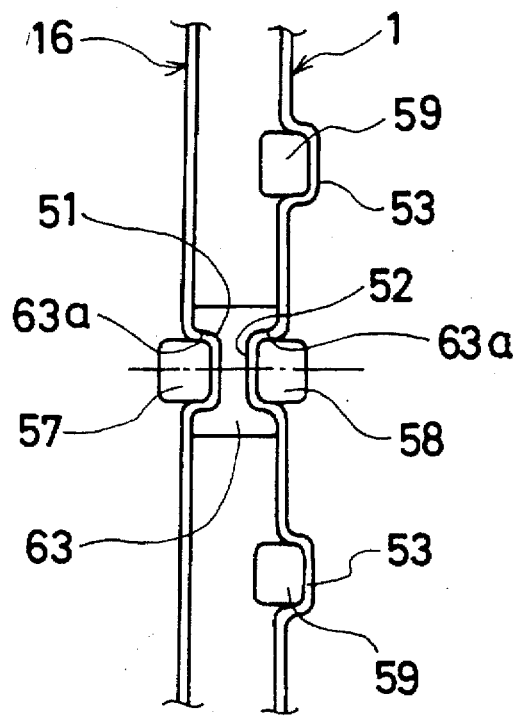
FIG. 24 is a developed view of the periphery of the connection structure shown in FIG. 23.

SIXTH EMBODIMENT:

FIGS. 23 and 24 show the sixth embodiment of the connection structure for connecting the drive shaft 17 and the disc joint 1. This embodiment employs reinforcing members 63 each having a bolt inserting hole, as well as the component parts employed in the fifth embodiment. The reinforcing members 63 have a cross-sectional shape of the letter "T" and are fittable onto the projected seats 52, 53 of the disc joint 1 and the flange 16. When the flange 16 and the disc joint 1 are connected, the reinforcing members 63 are sandwiched between the projected seats 52 and 53. The flange 16 and the disc joint 1 are bolted to each other by using the reinforcing members 63 and the other reinforcing members 57, 58 fitted into the corresponding recesses.

According to the sixth embodiment, in addition to the side walls 54a, 55a of the recesses 54, 55, the side-protruding portions of the "T"-shape reinforcing members 63 also readily receive torque. Therefore, the sixth embodiment further improves the reliability of the connection structure in connection with strength.

Figure 25:
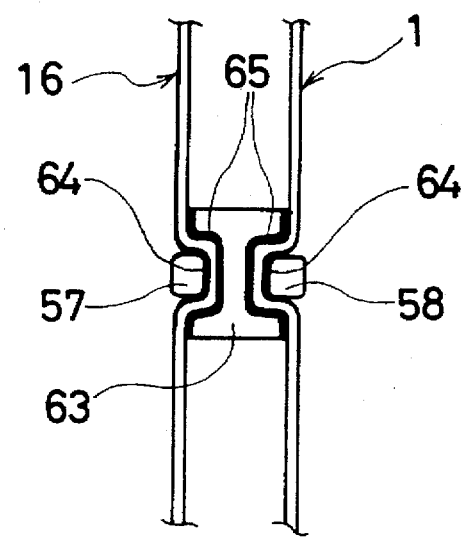
FIG. 25 is a developed view of the periphery of a modification of the sixth embodiment.

The fifth and sixth embodiments may be modified as shown in FIG. 25. In this modification, elastic members 64, 65 are provided between the reinforcing members 57, 58 and the surfaces of the corresponding recesses 54, 55 and between the reinforcing members 63 and the surfaces of the projected seats 51, 52. Because the elastic members 64, 65 absorb the impact caused by a sharp torque fluctuation, the reliability of the connection structure in connection of strength can be further improved.

Figure 26:
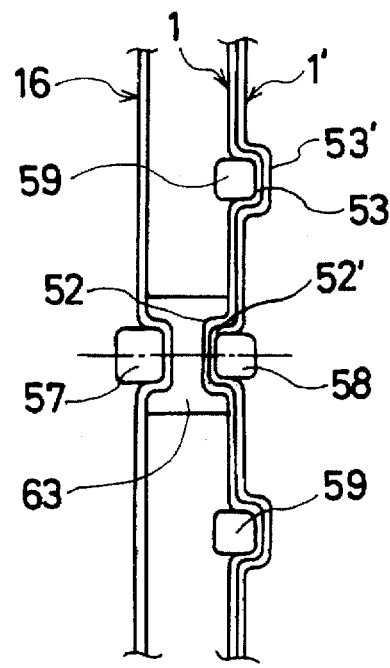
FIG. 26 is a developed view of the periphery of another embodiment of the connection structure (a seventh embodiment of the invention).

SEVENTH EMBODIMENT:

FIG. 26 shows still another embodiment of the connection structure for connecting the drive shaft 17 and the disc joint 1 (the seventh embodiment of the invention). The seventh embodiment employs two disc joints 1, 1' each of which is thinner than the disc joint 1 employed in the fifth and sixth embodiments. The total thickness of the two disc joints 1, 1' substantially equals the thickness of the disc joint 1 in the above embodiments. The two disc joints 1, 1' are joined side-by-side and bolted as an integral unit to the flange 16 of the drive shaft 17 in substantially the same manner as in the above embodiments.

According to the seventh embodiment, the unit of the two disc joints 1, 1' withstands substantially the same amount of torque as the disc joint 1 in the fifth and sixth embodiments, and provides for a larger joint angle than that disc joint 1. In addition, if two of the disc joints 1 as used in the fifth and sixth embodiments are joined side-by-side and used as an integral body, such a unit will withstand a larger torque than each of the disc joints in those embodiments when compared with respect to a single fixed joint angle.

Figure 27:
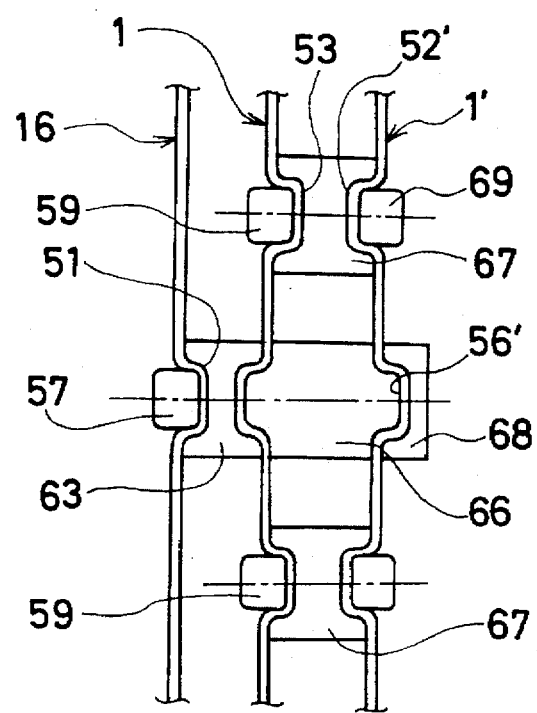
FIG. 27 is a developed view of the periphery of a modification of the seventh embodiment.

FIG. 27 shows a modification of the seventh embodiment. In this modification, the disc joints 1 and 1' are faced to each other so that the recesses 55 and the projected seats 53 of the disc joint 1 are positioned to the recesses 56' and the projected seats 52' of the disc joint 1', respectively, substantially symmetrically about a plane between the two disc joints 1 and 1', more specifically, a plane equidistantly apart therefrom. Reinforcing members 66 and 67 are sandwiched between the recesses 55 and 56' and between the projected seats 53 and 52'. The disc joint 1' is provided with other reinforcing members 68, 69 fitted to the opposite sides of the recesses 56' and the projected seats 52'. The unit of the disc joints 1, 1' is then bolted to the flange 16 of the drive shaft 17. Similar to the seven embodiment, this modification provides for an increased joint angle.

Figure 28:
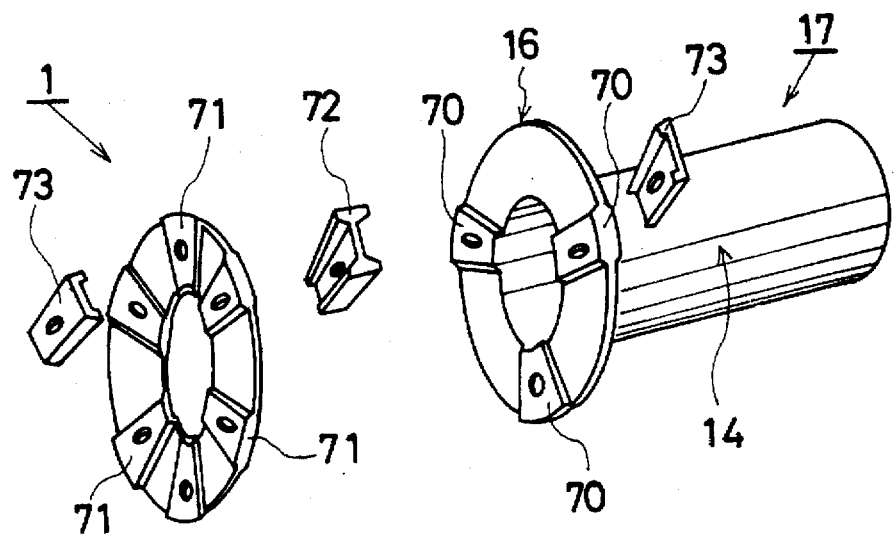
FIG. 28 is an exploded perspective view of a still further embodiment of the connection structure (an eighth embodiment of the invention).
Figure 29:
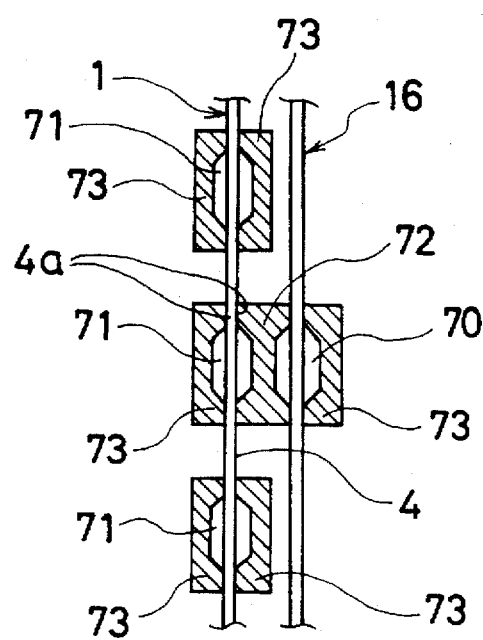
FIG. 29 is a developed view of the periphery of a modification of the eighth embodiment.

EIGHTH EMBODIMENT:

FIGS. 28 and 29 show a further embodiment of the connection structure between the drive shaft 17 and the disc joint 1 (the eighth embodiment of the invention). In this embodiment, the flange 16 of the drive shaft 17 has plural (three in FIG. 28) thicker portions 70 which are equidistantly arranged in the circumferential direction, and the disc joint 1 also has plural (six in FIG. 28) thicker-walled portions 71 which are equidistantly arranged along the circumference. Each of the thicker portions 70 and 71 has a bolt inserting hole. The drive shaft 17 and the disc joint 1 are positioned so that the thicker portions 70 of the flange 16 face three of the six thick portions 71 which are alternately selected. Reinforcing members 72 having a sectional shape of the letter "T" are sandwiched between the thick portions 70 and the three thicker portions 71, that is, each reinforcing member 72 is fitted onto both a thicker portion 70 of the flange 16 and the corresponding thicker portion 71 of the disc joint 1. Further, other reinforcing members 73 having a sectional shape of the bracket "[" are each fitted onto the other side of each of the thicker portions 70 and the three thicker portions 71, that is, the side thereof remote from the reinforcing members 72. The disc joint 1 is fastened to the flange 16 by bolts (not shown) inserted in the holes of the thicker portions 70, 71 and the reinforcing members 72, 73.

According to the eighth embodiment, the side surfaces of the thicker portions 70, 71 serve as torque receiving surfaces. Therefore, as in the fifth embodiment, even if the disc joint 1 and the flange 16 of the drive shaft 17 are made of fiber reinforced resin, the connection structure according to the eighth embodiment will withstand a considerably large torque fluctuation. Further, because, as shown in FIG. 29, the reinforcing members 72, 73 support portions 4a of the flexible (thin) portions 4 of the disc joint 1, the supported portions 4a contribute to torque transmission and effectively withstand bending.

The other three thicker portions 71 of the disc joint 1 are used for connection to a transmission and the like.

The thicker portions 70 and 71 are formed by molding as described below during the processes of producing the drive shaft 17 and the disc joint 1, respectively.

Figure 30:
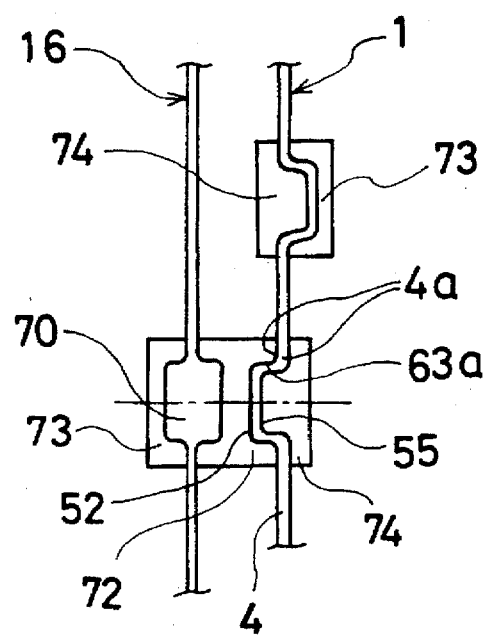
FIG. 30 is a developed view of the periphery of a further embodiment of the connection structure (a ninth embodiment of the invention).

NINTH EMBODIMENT:

FIG. 30 shows a further embodiment of the connection structure for connecting the drive shaft 17 and the disc joint 1 (the ninth embodiment of the invention). The ninth embodiment is substantially a combination of the disc joint 1 in the seventh embodiment and the drive shaft 17 in the eighth embodiment. More specifically, the reinforcing members 72 having a sectional shape of the letter "T" are sandwiched between the projected seats 52 of the disc joint 1 and the thicker portions 70 of the flange 16, and the reinforcing members 73 (FIG. 29) having a sectional shape of the bracket "[" are fitted onto the other sides of the thick portions 70. Further, reinforcing members 74 having a sectional shape of substantially the letter "T" are fitted to the recesses 55 of the disc joint 1. The disc joint 1 is fastened to the flange 16 by bolts (not shown) inserted through the the reinforcing members 72, 73, 74, the projected seats 52 and the thick portions 70.

According to the ninth embodiment, because the side walls of the recesses 55 and the portions 4a of the flexible portions 4 supported by the reinforcing members 72, 73, 74 contribute to torque transmission, the connection structure withstands a large torque fluctuation.

The other projected seats 53 of the disc joint 1 are used for connection to a transmission and the like by using the reinforcing members 73, 74.

Figure 22:
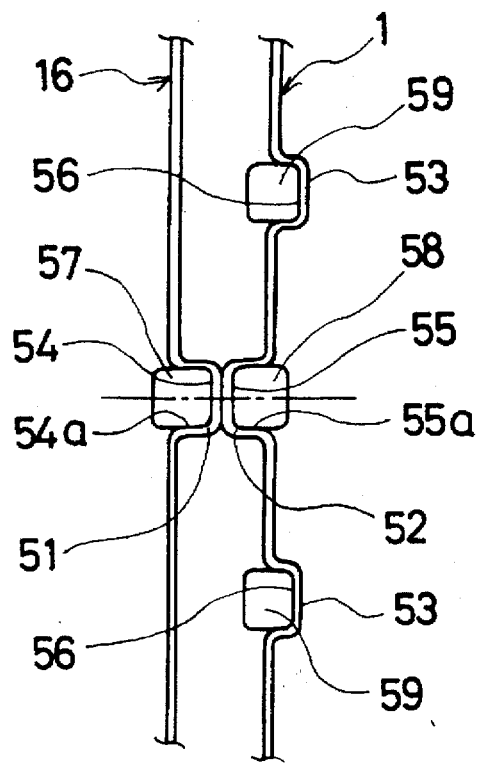
FIG. 22 is a developed view of the periphery of the connection structure shown in FIG. 21.
Figure 31:
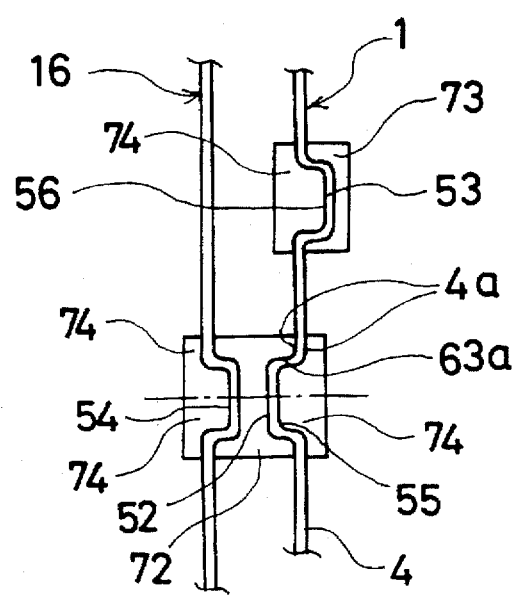
FIG. 31 is a developed view of the periphery of a modification of the ninth embodiment.

OTHER MODIFICATIONS:

The reinforcing members 73, 74 may be used in the fifth or sixth embodiment in place of the reinforcing members 57, 58, 59 (FIGS. 22 and 24). Then, a connection structure as shown in FIG. 31 is formed. Referring to FIG. 31, the reinforcing members 74 having a sectional shape of substantially the letter "T" are fitted to the recesses 55, 56 of the disc joint 1 and the recesses 54 of the flange 16, and the reinforcing members 73 having a sectional shape of the bracket "[" are fitted to the projected seats 53 of the disc joint 1. The connection structure thus formed has advantages in torque transmission.

Figure 32:
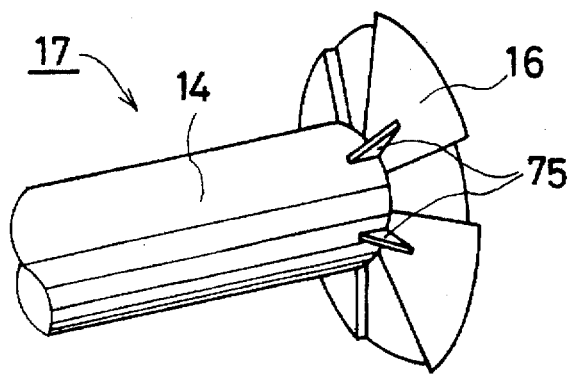
FIG. 32 is a schematic perspective view of a further embodiment of the drive shaft of the invention.

The drive shaft 17 described in connection with the above embodiments may be formed, as shown in FIG. 32, so as to have plural ribs 75 arranged along the boundary between the shaft body 14 and the flange 16. The ribs 17 increases the rigidity of the flange 16, thus increasing the connection strength.

Figure 33:
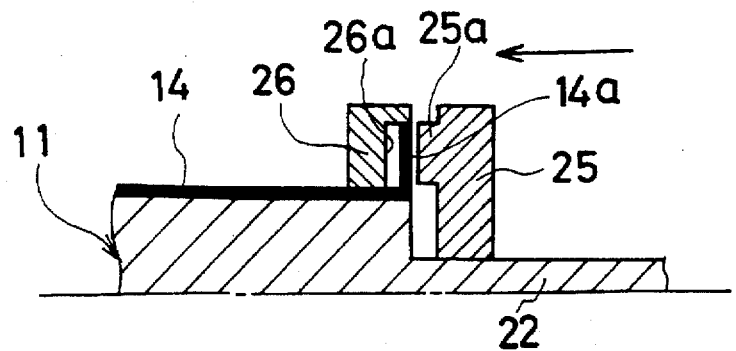
FIG. 33 is a sectional view of a mandrel, a drive shaft and a mold, illustrating an embodiment of the method of forming projected seats on the flange of a drive shaft according to the invention.

MOLDING OF FLANGE:

To form projected seats 52, 53 on the flange 16 of the drive shaft 17, a forming mold 25 and a backing mold 26 as shown in FIG. 33 are used. The forming and backing molds 25, 26 are similar to the molds used in the first embodiment (see FIG. 4) but have on their molding surfaces projection 25a and recess 26a, respectively. In the flange forming process, the projection 25a of the forming mold 25 force the expanded end portion of the shaft body 14 into the recess 26a of the backing mold 26.

Figure 34:
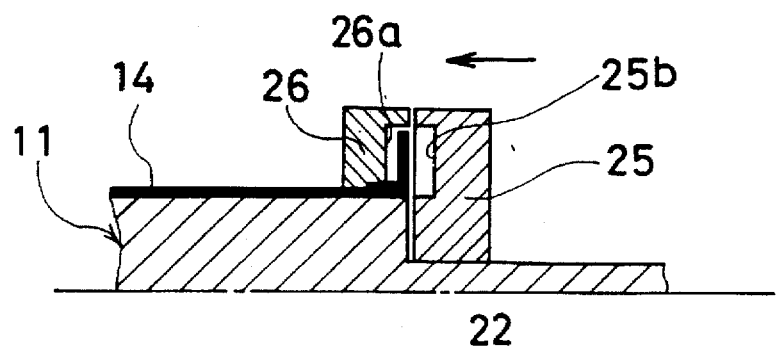
FIG. 34 is a sectional view of a mandrel, a drive shaft and a mold, illustrating an embodiment of the method of forming thicker portions on the flange of a drive shaft according to the invention.

The thicker-walled portion 70 can be formed on the flange 16, as shown in FIG. 34, by using a forming mold 25 and a backing mold 26 having on their molding surfaces recess 25b and recess 26a, respectively. The recesses 25b, 26a are substantially filled with a resin impregnated fiber or the like. Then, the two molds 25, 26 are pressed onto the flange 16.

Figure 35:
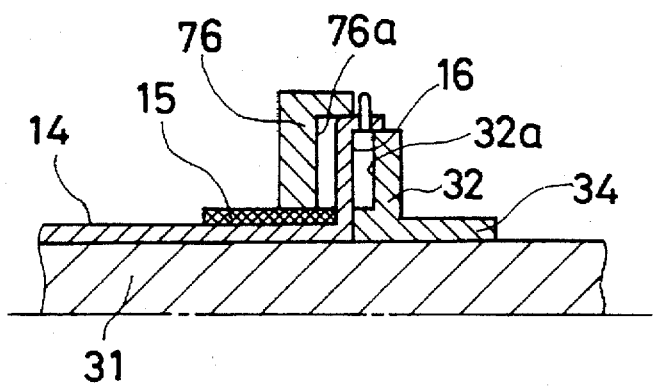
FIG. 35 illustrates another embodiment of the method of forming thicker portions on the flange of a drive shaft according to the invention.

The projected seats 52, 53 or the thicker portion 70 may also be formed by using a forming mold similar to that used in the second embodiment (see FIG. 8). FIG. 35 shows an example of the process of forming a flange having thicker portion. The flange portion 32 of a jig 34 has recess 32a on its molding surface, and placed on a side of the flange 16, the side being remote from the shaft body 14. A backing mold 76 having recess 76a is placed on the other side of the flange 16. The recess 32a and 76a of the jig 34 and the backing mold 76, respectively, are substantially filled with resin impregnated fiber or the like. The two molds are then pressed onto the flange 16 of the drive shaft 17. The thicker portion 70 are thus formed on the flange 16.

METHOD OF FORMING FRP DISC JOINT:

Methods of forming an FRP disc joint 1 as used in the fifth and eighth embodiments will be described.

Figure 36:
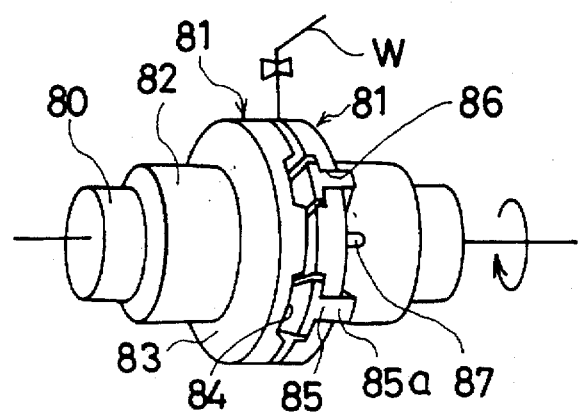
FIG. 36 is a schematic perspective view of an arrangement of jigs used for forming a disc joint according to the fifth embodiment of the invention.
Figure 37:
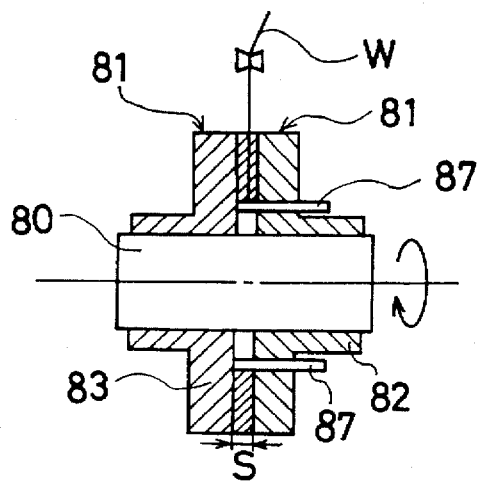
FIG. 37 is a sectional view of the jigs as shown in FIG. 36, illustrating the operation thereof.
Figure 38:
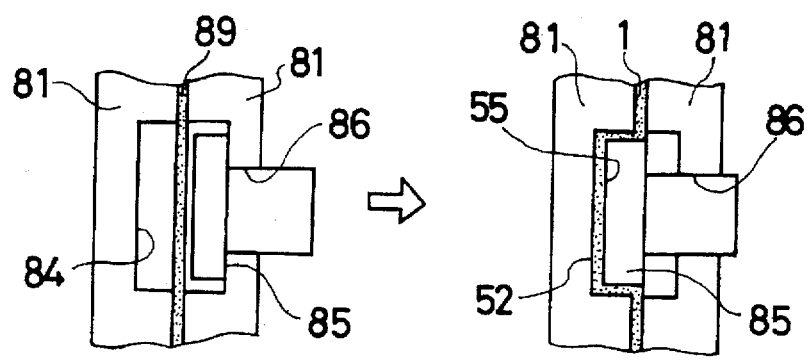
FIG. 38 shows portions of the jigs in enlarged views, illustrating the operation thereof.

FIGS. 36 to 38 illustrate a method of forming the FRP disc joint 1 (FIG. 21) as used in the fifth embodiment. This method uses a rotatable shaft 80 rotated by a driving means (not shown) and a pair of first and second hollow jigs 81, 81 fittable onto the shaft 80. Each jig 81 is formed of a tubular portion 82 and a flange portion 83 having plural grooves 84 which radially extend and are arranged equidistantly along the circumference. Each of the grooves 84 of the first jig 81 is connected to a slit extending through the thickness of the flange portion 83, and contains a pressing mold 85 whose operational portion 85a extends through the slit 86 and protrudes from the rear side of the flange portion 83. Further, the flange portion 83 of the first jig 81 has plural pins 87 which are removably inserted into holes axially extending through the flange portion 83. The flange portion 83 of each jig 81 has a diameter larger than the outside diameter of the disc joint 1 to be formed. The pins 87 are arranged along a pitch circle having a diameter larger than the inside diameter of the disc joint 1.

For forming a disc joint 1, the hollow jigs 81 are fitted on the rotatable shaft 80 so that the jigs 81 face each other but are apart by a gap corresponding to the thickness of the flexible portions 4 of the disc joint 1. The pins 87 are then inserted in the first jig 81 until the tips of the pins abut the molding surface of the second jig 81. The pressing molds 85 are positioned, beforehand, at the backward limit of the movable range so as not to accidentally protrude into the gap. Then, as shown in FIG. 37, a resin impregnated filament W is supplied into the gap between the flange portions 83 of the hollow jigs 81 while the shaft 80 is being rotated. The rotation of the shaft 80 is discontinued when the filament W is wound substantially up to the outside diameter of the flange portions 83. Thus, a filament laminated plate 89 having a thickness S substantially the same as that of the disc joint 1 but having a diameter larger than that of the disc joint 1 is formed between the flange portions 83. After the pins 87 of the first jig 81 are removed, the pressing molds 85 are moved forward to force the filament laminated plate 89 into the grooves 84 of the second jig 81. Because the pressing molding operation is performed on plural portions of the filament laminated plate 89 which are circumferentially aligned, the diameter of the plate 89 is reduced. Therefore, if this diameter reduction is considered when the filament W is wound, the filament laminated plate 89 will have a predetermined size of the disc joint 1 after being press-molded. The disc joint 1 having projected seat 54 and recess 54 is made after hot setting.

Although the above description is made in connection with the projected seat 52 on one side of the disc joint 1, it will be readily understood that the projected seat 53 on the other side of the disc joint 1 can be formed in the same manner.

Figure 39:
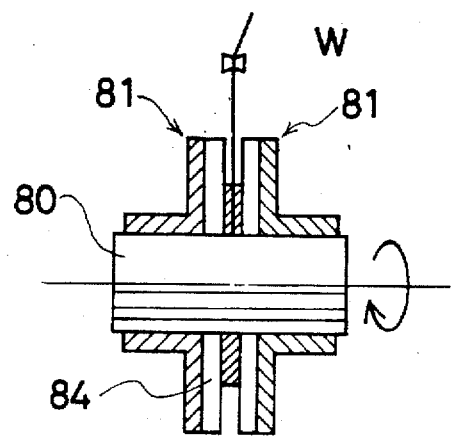
FIG. 39 shows a sectional view of the arrangement of jigs as shown in FIG. 36.
Figure 40:
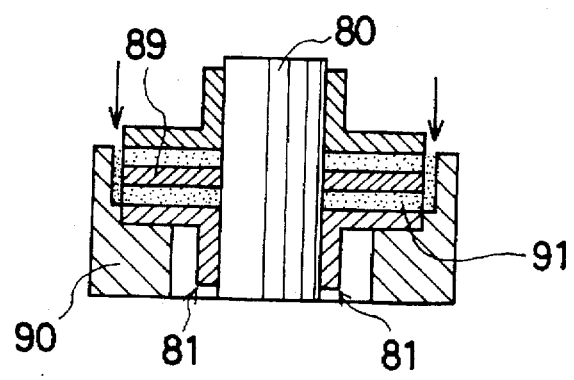
FIG. 40 shows a sectional view of the arrangement of jigs and a resin injection mold used for forming a disc joint according to the fifth embodiment of the invention.
Figure 41:
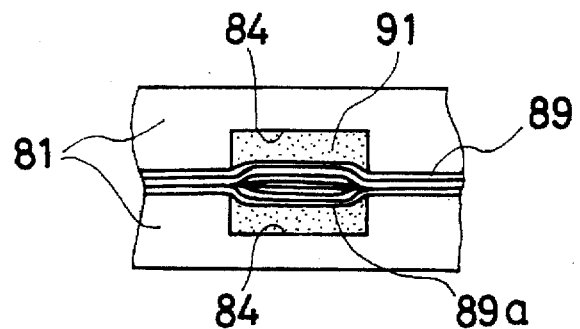
FIG. 41 is an enlarged view of a portion of the arrangement shown in FIG. 39.

A method of forming an FRP disc joint 1 having thicker portion 71 as used in the eight embodiment (see FIG. 28) will be described with reference to FIGS. 39 to 40. Since this disc joint 1 has no projected seat and is therefore free from the above-discussed diameter reduction caused during the process of forming projected seats, this method uses a pair of jigs 81 each having a flange portion 83 which has neither a pressing mold nor a pin but has grooves 84 similar to those described above. After the jigs 81 are set on the rotatable shaft 80 in substantially the same manner as described above, the resin impregnated filament W is wound up to a predetermined diameter to form a filament laminated plate 89 in a gap between the flange portions 83 by rotating the shaft 80, as shown in FIG. 39. Then, the assembly including the shaft 80, the jigs 81 and the filament laminated plate 89 is set in a resin injection mold 90 where resin 91 is injected to the groove 84 of the flange portion 83, as shown in FIG. 40. When hot setting is subsequently performed, a disc joint 1 having thicker portion 71 is formed as one unit. As shown in FIG. 41, because portions of the filament laminated plate 89 in the grooves 84 are free from restriction of the molding surfaces of the jigs 81, the portions form swollen portions 89a.

Therefore, when hot setting of the plate 89 and the resin 91 injected to the grooves 84 is performed, the swollen portions 89a are firmly engaged with the corresponding resin layers in the respective groove 84, thus enhancing the rigidity of the thicker portion 71.

The resin 91 may contain short filament. Such filament containing resin will further increase the strength of the thicker portion 71, which transmits torque.

Figure 42:
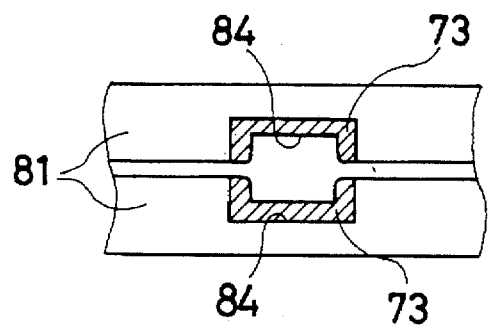
FIG. 42 illustrates another form of the use of the jigs as shown in FIG. 39.

Further, reinforcing member 73 (see FIG. 28) may be placed in the groove 84 of the jigs 81 beforehand, as shown in FIG. 42. The reinforcing member 73 will be firmly bonded to the thicker portion 71 and thus facilitate connecting the disc joint to the drive shaft 17.

Figure 43:
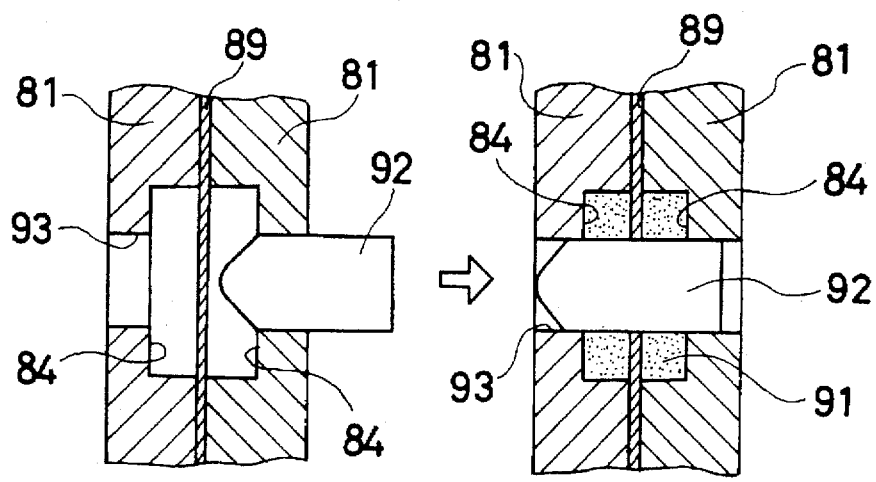
FIG. 43 illustrates a still another form of the use of the jigs as shown in FIG. 39.

FIG. 43 shows a modification of the jigs 81. In this modification, one of the jigs 81 is provided with tapered insert pins 92 which are protrusible through the gaps formed by the groove 84 to the other jig 81, and the other jig 81 is provided with hole 93 for receiving the insert pin 92. After the filament W is wound to form a filament laminated plate 89, the insert pins 92 are advanced to penetrate the plate 89. After the hot setting process following the injection of the resin 91 to the groove 84, the insert pins 92 are pulled out, thus forming bolt inserting holes which are used for bolting to the drive shaft 17. The production cost is thus reduced.

Figure 44:
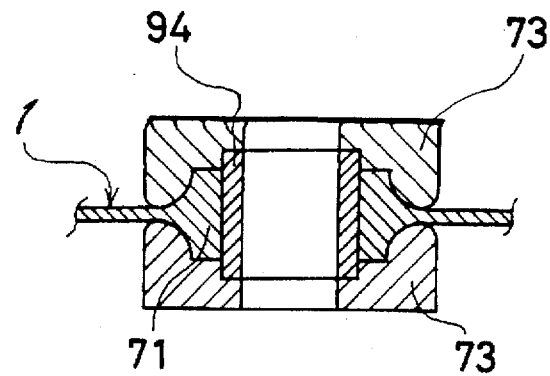
FIG. 44 illustrates a modification of a disc joint according to the connection structure of the invention.
Figure 45:
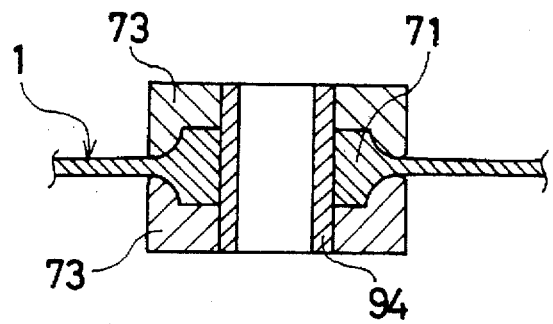
FIG. 45 illustrates another modification of a disc joint according to the connection structure of the invention.

A collar may be fitted in each bolt inserting hole to substantially prevent the fiber reinforced resin from creeping. In the constructions shown in FIGS. 44 and 45, since reinforcing member 73 is fit on each thicker portion 71 and the collar 94, the bolt inserted in the hole abuts the collar 94 and the reinforcing member 73. Further, since the collar 94 has a length greater than the thickness of the thicker portion 71, the end portions of the collars 94 protrude and thus facilitate positioning the reinforcing member 73 to the thicker portion 71.

The strength the disc joints as described above significantly varies depending on the orientation angle of the filament. As the orientation angle with respect to the direction of torque indicated by the arrow a becomes large, the tensile strength of the disc joint decreases. Therefore, to achieve optimal strength of the thin portions 4 of the disc joint 1, the filament winding direction must substantially coincide with the torque direction a, that is, the orientation angle with respect to the torque direction a must be reduced as close to zero as possible. FIGS. 46 to 49 illustrate a method for achieving such optimal orientation angle of the filament. This method uses an arrangement of a rotatable shaft and jigs similar to that shown in FIG. 39. As shown in FIGS. 46 to 49, the arrangement used in this method comprises: a rotatable shaft 80' having a polygonal (hexagonal, in the FIG. 46) cross-sectional shape; and a pair of jigs 81, 81 each having a movable plate 95 provided substantially at a center line of each groove 84, the center line being defined with respect to the width of the groove 84. The movable plates 95 can be projected into the grooves 84.

Figure 46:
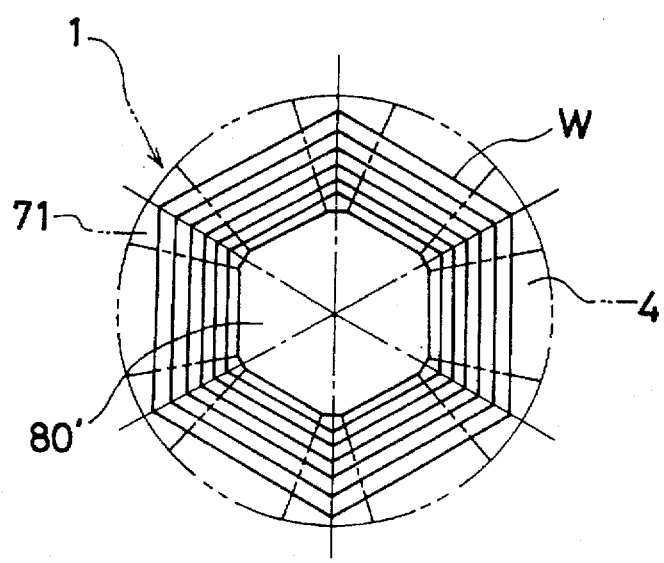
FIG. 46 illustrates a disc joint in which a resin impregnated fiber is wound in the shape of, for example, a hexagon.
Figure 47:
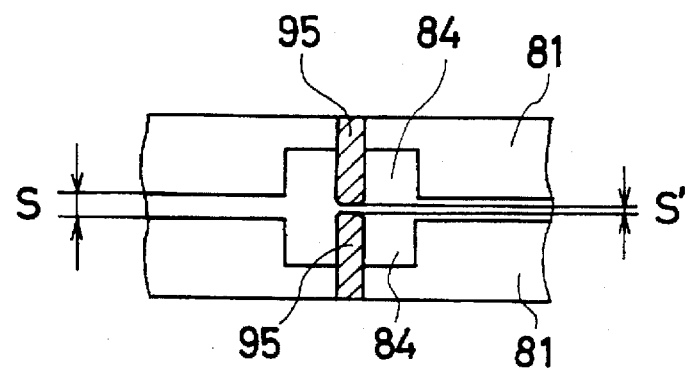
FIG. 47 is a sectional view of a jig arrangement employed to wind a resin impregnated filament in the shape of a polygon.
Figure 48:
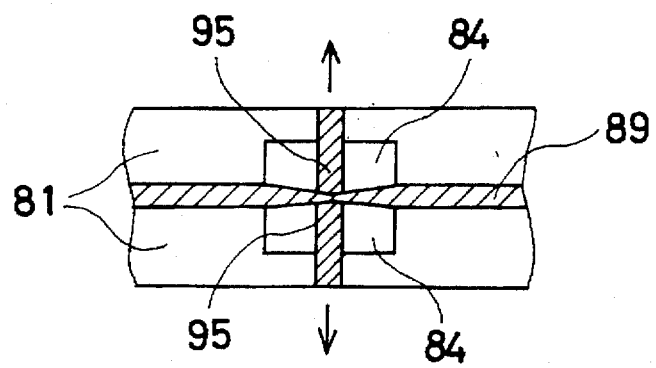
FIG. 48 illustrates how the jig arrangement shown in FIG. 47 is used for forming a disc joint.

For production of a disc joint 1, the jigs 81, 81 fitted on the rotatable shaft 80' are positioned so that the jigs 81, 81 are spaced from each other by a gap having a size s, as shown in FIG. 47. The gap size s substantially equals the thickness of the thinner portion 4 of the disc joint 1. The movable plate 95 of the jigs 81 are moved into the groove 84 and positioned so that the front ends of the movable plates 95 of each jig 81 protrude from the plane of the molding surfaces of the same jig 1 corresponding to the thinner portion 4 of the disc joint 1, and so that each of the movable plates 95 of one of the jigs 81 is spaced apart from the corresponding one of the movable plate 95 of the other jig 81 by a gap having a size s' smaller than the gap size S. The resin impregnated filament W is then wound in the same manner as illustrated in FIG. 39. Since the size S' of the gaps between the movable plates 95 is smaller than the size S of the gap between the jigs 81, 81, the filament laminating rate is greater in the gaps s' between the movable plate 95 that the other parts 0f the filament winding course which includes the gap S between the jigs 81. Therefore, the filament lamination becomes highest at the above-defined center lines of the grooves 84. More specifically, as shown in FIG. 46, each turn of the filament W thus wound forms substantially a contour of a polygon (a hexagon in FIG. 46) whose vertexes coincide with the above-defined center line of the groove 84. Thus, the filament W in portions of the filament laminated plate corresponding to the thinner portion 4 is orientated in the torque direction a. Then, the movable plates 95 are moved back as indicated in FIG. 48. After resin 91 is injected into the groove 84 in a manner as shown in FIG. 40, hot setting is performed. A disc joint having a high tensile strength is thus obtained.

Figure 49:
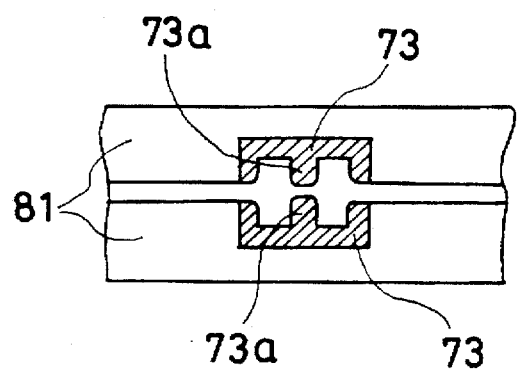
FIG. 49 is a sectional view of a modification of the jig arrangement shown in FIG. 47.
Figure 50:
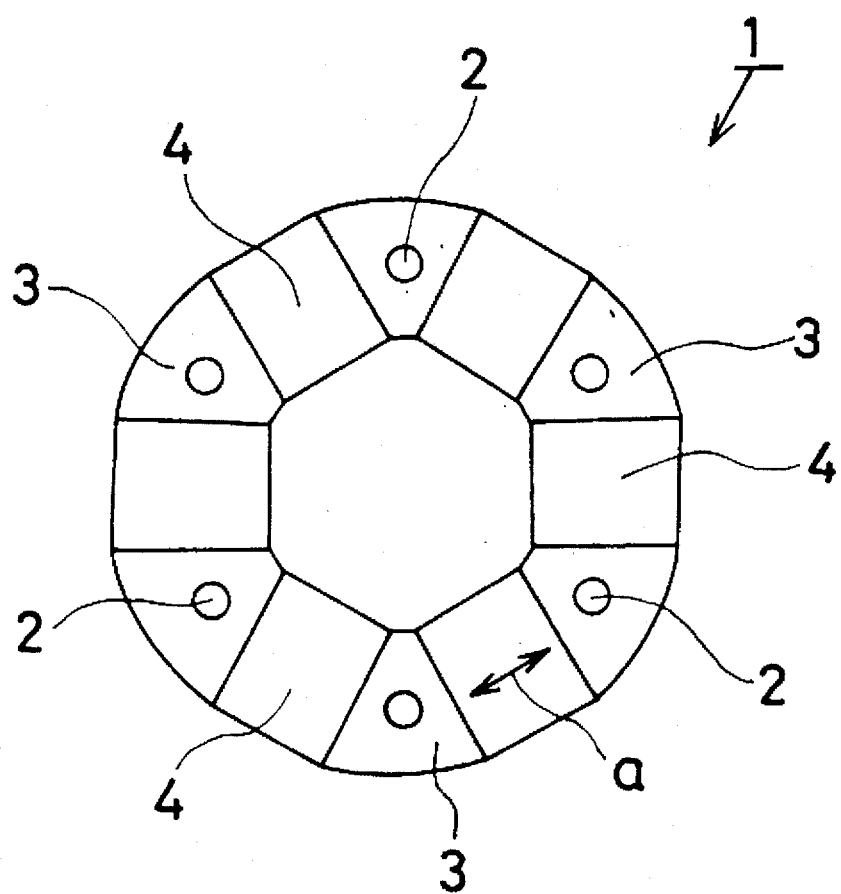
FIG. 50 is a schematic plan view of a conventional disc joint.

If insert-molding of reinforcing members is employed, reinforcing member 73 each having a projection 73a as shown in FIG. 49 may be used instead of the movable plate 95 provided in the jig 81.

As described above, since a drive shaft according to the present invention is composed of flanges and a shaft body which are formed of a resin impregnated filament as in a body, the total weight of the drive shaft is substantially less than the total weight of a conventional FRP drive shaft having metallic yokes. The drive shaft of the invention is particularly suitable for a propeller shaft of a motor vehicle.

Further, since a drive shaft producing method according to the invention comprises the steps of: forming a shaft body by winding a resin impregnated filament on a mandrel in a manner of a filament winding method; and forming flanges by expanding or binding up end portions of the shaft body, the method facilitates producing a drive shaft composed of a shaft body and flanges which are entirely formed of filament reinforced resin.

In a structure for connecting a disc joint and a drive shaft according to the present invention, since the walls of the recesses or the side surfaces of the thicker portions provided on the disc joint and the flanges of the drive shaft receive a substantially large part of the torque transmitted, the stress which occurs in portions surrounding the inner surfaces of the bolt inserting holes is accordingly reduced. Thus, the connecting structure will withstand a large torque fluctuation.

While the present invention has been described with reference to what are considered to be the preferred embodiments, it will be understood that the invention is not limited to the disclosed embodiments but covers various modifications as fall within the spirit and scope of the appended claims.

What is claimed is:

1. A method of manufacturing a drive shaft which comprises a shaft body and an end flange made of fiber reinforced resin in a body, said method comprising the steps of:

forming a mandrel unit by abutting at least one auxiliary mandrel having a plurality of pins against an end portion of a main mandrel;

winding a resin impregnated fiber on the mandrel unit and hooking the resin impregnated fiber on the pins in such a manner that the resin impregnated fiber is wound over a circumferential surface of the mandrel unit at a predetermined orientation angle with respect to an axis of the mandrel unit so as to form a shaft body;

detaching the auxiliary mandrel from the main mandrel so as to provide for an opening at an end portion of the shaft body;

expanding the end portion of the shaft body by pressing a pressing mold into the opening so as to form an end flange on said shaft body; and hot setting the shaft body with the resin impregnated fiber wound thereon;

wherein said hooking of the resin impregnated fiber includes hooking said resin impregnated fiber in a circumferential direction on a plurality of said pins at a time to form loops at the end portion of the shaft body, wherein the loops extend about at least two of said pins which are in the same plane and are radially disposed about the shaft body in a manner to permit said expanding of the end portion of the shaft body.

2. A method as set forth in claim 1, wherein said step of forming said mandrel unit comprises the step of:

slidably fitting the auxiliary mandrel on a small diameter portion of said main mandrel which extends from a large diameter portion of said main mandrel.

3. A method as set forth in claim 1, comprising the further steps of:

removing the pins of said auxiliary mandrel after the forming of the shaft body.

4. A method as set forth in claim 1, wherein said step of expanding the end portion of the shaft body comprises the step of:

slidably fitting said pressing mold on the small diameter portion of said main mandrel so as to permit said pressing mold to slide toward the end portion of the shaft body and expand said end portion.

5. A method as set forth in claim 4, comprising the further steps of:

removing said pressing mold after the end portion of the shaft body is expanded;

slidably fitting a forming mold on the small diameter portion of the main mandrel;

placing a backing mold on the shaft body; and clamping the expanded end portion of the shaft body between said forming mold and said backing mold.

6. A method as set forth in claim 1, comprising the further step of:

further winding the resin impregnated fiber on a portion of the shaft body which corresponds to the main mandrel and which is adjacent to an abutting joint between said main mandrel and said auxiliary mandrel at an orientation angle which is substantially perpendicular to the axis of the mandrel unit to form a reinforcing band.

7. A method as set forth in claim 1, comprising the further step of:

removing the main mandrel from the shaft body so as to provide for a hollow shaft body and end flange.

* * * * *